(12) United States Patent
Mason

(10) Patent No.: US 11,913,569 B1
(45) Date of Patent: Feb. 27, 2024

(54) SERVICEABLE BALL CHECK VALVE

(71) Applicant: NIBCO Inc., Elkhart, IN (US)

(72) Inventor: Christopher W. Mason, Granger, IN (US)

(73) Assignee: NIBCO Inc., Elkhart, IN (US)

( * ) Notice: Subject to any disclaimer, the term of this patent is extended or adjusted under 35 U.S.C. 154(b) by 0 days.

(21) Appl. No.: 17/953,629

(22) Filed: Sep. 27, 2022

(51) Int. Cl.
*F16K 43/00* (2006.01)
*F16K 15/18* (2006.01)
*F16K 15/02* (2006.01)

(52) U.S. Cl.
CPC ........ *F16K 43/001* (2013.01); *F16K 15/1848* (2021.08); *F16K 15/025* (2013.01); *Y10T 137/7843* (2015.04)

(58) Field of Classification Search
CPC .............. F16K 15/025; F16K 15/1848; Y10T 137/7843
See application file for complete search history.

(56) References Cited

U.S. PATENT DOCUMENTS

| | | | | |
|---|---|---|---|---|
| 4,449,694 A | * | 5/1984 | Hobart | F16K 5/0668 251/315.13 |
| 4,991,655 A | * | 2/1991 | McHugh | E03B 7/072 137/557 |
| 5,154,232 A | * | 10/1992 | McHugh | A62C 35/68 169/5 |
| 5,297,635 A | * | 3/1994 | McHugh | E03B 7/072 169/23 |
| 5,566,708 A | * | 10/1996 | Hobbs, Jr. | F16L 19/02 285/354 |
| 5,785,074 A | * | 7/1998 | Kieper | F16K 5/0605 137/625.22 |
| 6,302,446 B1 | | 10/2001 | Spears et al. | |
| 6,397,878 B1 | * | 6/2002 | Nolan | E03C 1/108 137/218 |
| 6,460,563 B2 | | 10/2002 | Olson et al. | |
| 6,655,412 B2 | | 12/2003 | Reck | |
| 7,306,010 B2 | * | 12/2007 | Gruener, Sr. | F16K 5/0647 251/315.16 |
| 7,363,935 B2 | | 4/2008 | Anderson et al. | |

(Continued)

FOREIGN PATENT DOCUMENTS

| | | |
|---|---|---|
| CN | 203395270 | 1/2014 |
| CN | 205781020 | 12/2016 |

(Continued)

OTHER PUBLICATIONS

The Plumber's Choice, "1-1/4 in x 2 in SWT high flow drain ball valve, purge for pipe cleanout, 3-way adjustable flow path, brass," https://www.homedepot.com/p/The-Plumber-s-Choice . . . (Oct. 9, 2020).

(Continued)

*Primary Examiner* — Daphne M Barry
*Assistant Examiner* — Frederick D Soski
(74) *Attorney, Agent, or Firm* — PRICE HENEVELD LLP

(57) ABSTRACT

A ball check valve assembly includes a combination ball valve and spring check valve within a valve assembly. The use of union ends on the valve assembly permits the easy removal and replacement of the components of the valve assembly from a plumbing system. An integral bleeder valve allows for the pressure release and drainage of the ball check valve assembly before the union ends are decoupled.

20 Claims, 7 Drawing Sheets

(56) References Cited

U.S. PATENT DOCUMENTS

| | | | |
|---|---|---|---|
| 7,506,665 B2* | 3/2009 | Gruener, Sr. | F16K 5/0626 251/315.16 |
| 7,631,662 B2 | 12/2009 | Reck | |
| 7,681,596 B2 | 3/2010 | Reck | |
| 8,375,991 B2 | 2/2013 | Erhardt | |
| 10,036,481 B2* | 7/2018 | Reck | F16K 27/067 |
| 10,458,662 B2 | 10/2019 | Olsen et al. | |
| 10,571,039 B1* | 2/2020 | Barrett | F16K 27/0227 |
| 10,823,316 B2* | 11/2020 | Lawrence | F16L 13/142 |
| 2004/0124386 A1 | 7/2004 | Carey | |
| 2004/0206404 A1* | 10/2004 | Yang | F16K 5/0605 137/614.17 |
| 2004/0261796 A1* | 12/2004 | Butler | A61G 10/026 128/205.26 |
| 2005/0045226 A1* | 3/2005 | Abe | F23D 14/825 137/75 |
| 2005/0109404 A1* | 5/2005 | Fazekas | F16K 5/06 137/512.3 |
| 2006/0196567 A1* | 9/2006 | Gruener | F16K 5/0647 251/315.01 |
| 2008/0135794 A1* | 6/2008 | Shnider | F16K 15/1848 251/315.1 |
| 2008/0164006 A1* | 7/2008 | Karamanos | F28F 9/002 165/163 |
| 2008/0314466 A1 | 12/2008 | Cimberio et al. | |
| 2008/0318079 A1* | 12/2008 | Ballantyne | F16L 13/0254 137/454.2 |
| 2010/0252129 A1 | 10/2010 | Olsen et al. | |
| 2010/0326531 A1* | 12/2010 | Oltman | F16K 5/0605 251/366 |
| 2011/0073201 A1 | 3/2011 | Matsui et al. | |
| 2011/0247706 A1* | 10/2011 | Wu | F16K 5/0605 137/535 |
| 2011/0253922 A1* | 10/2011 | Hughes | F16K 5/10 251/315.01 |
| 2014/0251474 A1* | 9/2014 | Oltman | F16K 15/1848 137/614.2 |
| 2014/0261725 A1* | 9/2014 | Karamanos | G01M 3/26 137/15.01 |
| 2015/0101684 A1* | 4/2015 | Yoder | F16K 35/06 137/385 |
| 2015/0129043 A1* | 5/2015 | Hughes | F16K 5/0605 137/12 |
| 2015/0323087 A1* | 11/2015 | Al-Amri | F16K 15/038 137/527 |
| 2015/0369411 A1* | 12/2015 | Kieper | F16L 33/30 285/239 |
| 2016/0069483 A1* | 3/2016 | Bobo | F16K 25/005 285/179 |
| 2016/0084398 A1* | 3/2016 | Reck | F16K 27/067 251/315.1 |
| 2016/0097550 A1 | 4/2016 | Karamanos | |
| 2016/0138723 A1* | 5/2016 | Al-Amri | F16K 15/02 137/15.22 |
| 2017/0002942 A1* | 1/2017 | Yang | F16K 5/0414 |
| 2017/0089592 A1* | 3/2017 | Olsen | F24D 3/1058 |
| 2017/0204979 A1* | 7/2017 | Yoder | F16K 27/105 |
| 2018/0156470 A1* | 6/2018 | Olsen | F24D 19/088 |
| 2019/0032801 A1* | 1/2019 | Andersson | F16K 1/12 |
| 2019/0078695 A1* | 3/2019 | Tanghetti | F16L 37/088 |
| 2019/0154160 A1* | 5/2019 | Yoder | F16K 27/107 |
| 2019/0170264 A1* | 6/2019 | Roy, Jr. | F16K 11/105 |
| 2019/0226592 A1 | 7/2019 | Hussein et al. | |
| 2019/0301625 A1* | 10/2019 | Ringer | F16K 5/0657 |
| 2020/0173569 A1* | 6/2020 | Koch | F16K 15/1848 |
| 2020/0278066 A1* | 9/2020 | Andersson | F16L 55/07 |
| 2023/0142662 A1* | 5/2023 | Aselton, II | B01F 35/718051 239/10 |

FOREIGN PATENT DOCUMENTS

| | | |
|---|---|---|
| CN | 106958670 | 7/2017 |
| CN | 207195715 | 4/2018 |
| JP | H7301351 | 11/1995 |
| JP | 2020097902 | 6/2020 |

OTHER PUBLICATIONS

Watts, "Series RPVM1-Press residential purge" flier, Watts.com (© 2020 Watts).

Webstone, "Propal Series" Ball Drain Valve brochure, Webstone Company, Inc. (© 2016 Webstone).

Webstone, Pro-Pal Series Union Ball Drain, www.webstonevalves. com/default.aspx?page=customer&file=customer/wecoin/ customerpages/unionballdrain.htm (2020).

* cited by examiner

SERVICEABLE BALL CHECK VALVE

BACKGROUND OF THE INVENTION

The present invention relates generally to a plumbing system with a serviceable ball check valve assembly. In a spring check valve, a stopper mechanism is used to control the flow of fluid. Spring check valves have hollow bodies and a large stopper, which receives constant pressure from the spring. When a fluid flow is forward at a sufficiently high pressure, the force will overcome the pressure from the spring and cause the stopper to open allowing the desired flow. A spring check valve can be used to prevent a downstream water hammer from entering into upstream piping and/or components. A water hammer is a pressure surge of water that can occur when a valve closes and/or other pressure changing activity happens with an appliance. A spring check valve can absorb or dampen a water hammer as the spring check valve will absorb the pressure surge. The service check valve assembly includes a ball valve with an inline spring check valve. Typical inline spring check valves are not serviceable once installed into a plumbing or hydronic system. Dirt and debris can sometimes get clogged in the spring check valve mechanism causing it to get stuck in an open or closed position thereby no longer functioning correctly. Once this occurs, the valve must be cut out of the system and damaging the end connections, making it no longer usable.

An isolation ball valve with an integral inline spring check valve allows the valve body to be easily removed for service and/or to be replaced. This includes the servicing or replacement of the spring check valve assembly.

SUMMARY OF THE INVENTION

One aspect of the present invention is a ball check valve assembly. The ball check valve comprises a body with a fluid passageway extending between an incoming fitting end and an outgoing fitting end. The ball check valve assembly has a first valve member in the fluid passageway. A spring check valve is positioned in the fluid passageway between the first valve member and the outgoing fitting end. A bleeder drain valve is positioned on the body between the incoming fitting end and the first valve member.

Another aspect of the invention is a valve assembly. The valve assembly comprises a body with a fluid passageway extending between an incoming fitting end and an outgoing fitting end. The valve assembly has a first valve member with a ball positioned in the fluid passageway. A spring check valve is positioned in the fluid passageway in between the first valve member and the outgoing fitting end. A bleeder drain valve is positioned on the body between the incoming fitting end and the first valve member.

Another aspect of the invention is a piping assembly. The piping assembly comprises a valve body with a fluid passageway extending between an incoming fitting end and an outgoing fitting end. The piping assembly has a first valve member in the fluid passageway, and a spring check valve is positioned in the fluid passageway in between the first valve member and the outgoing fitting end. A bleeder drain valve is positioned on the body between the incoming fitting end and the first valve member. An incoming water supply pipe is coupled to the incoming fitting end and an outgoing water supply pipe coupled to the outgoing fitting end.

These and other features, advantages, and objects of the present invention will be further understood and appreciated by those skilled in the art by reference to the following specification, claims, and appended drawings.

DETAILED DESCRIPTION

For purposes of description herein, the terms "upper," "lower," "right," "left," "rear," "front," "vertical," "horizontal," and derivatives thereof shall relate to the invention as oriented in Figures. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
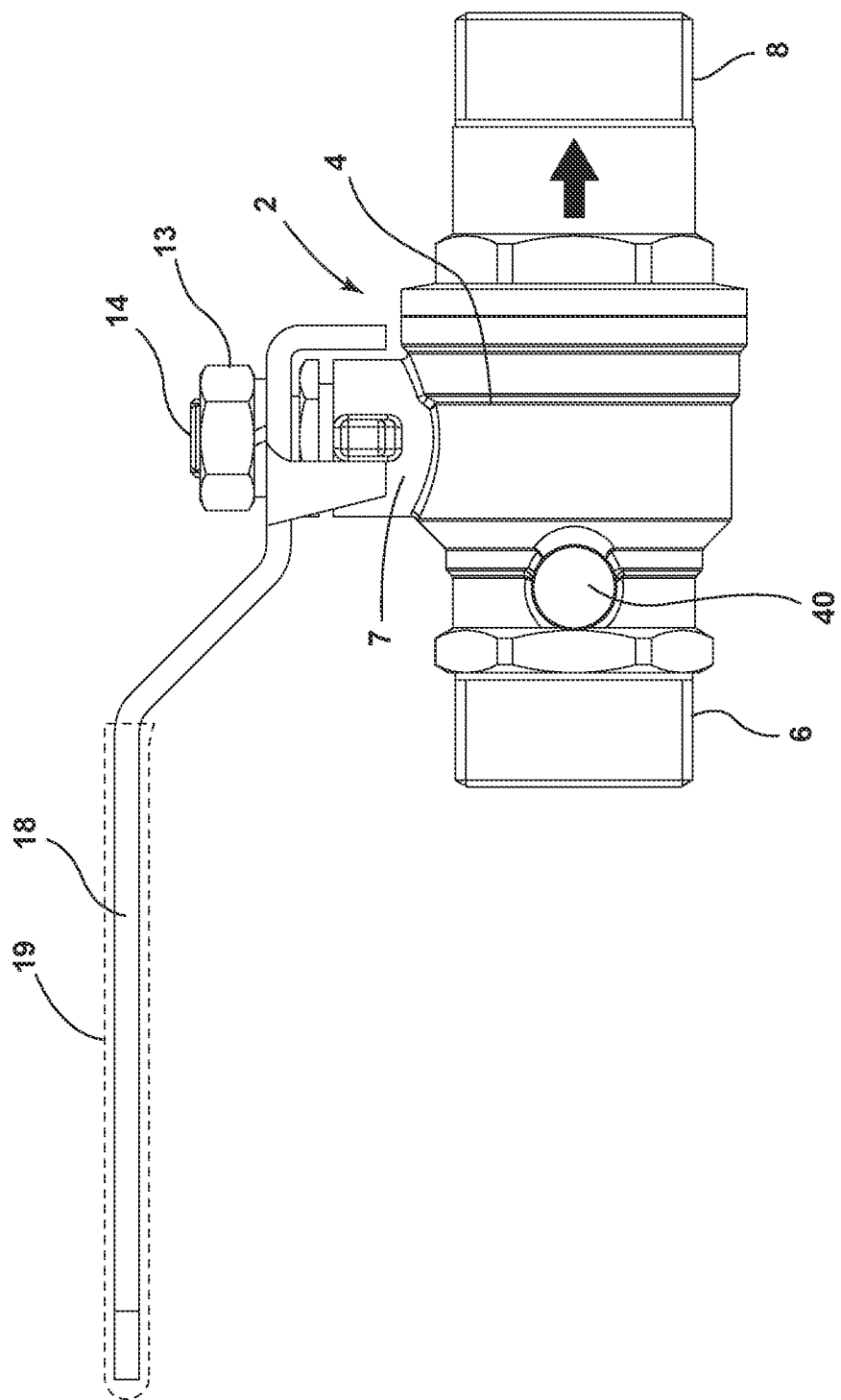
FIG. 1 is a front view of the ball check valve assembly.
Figure 2:
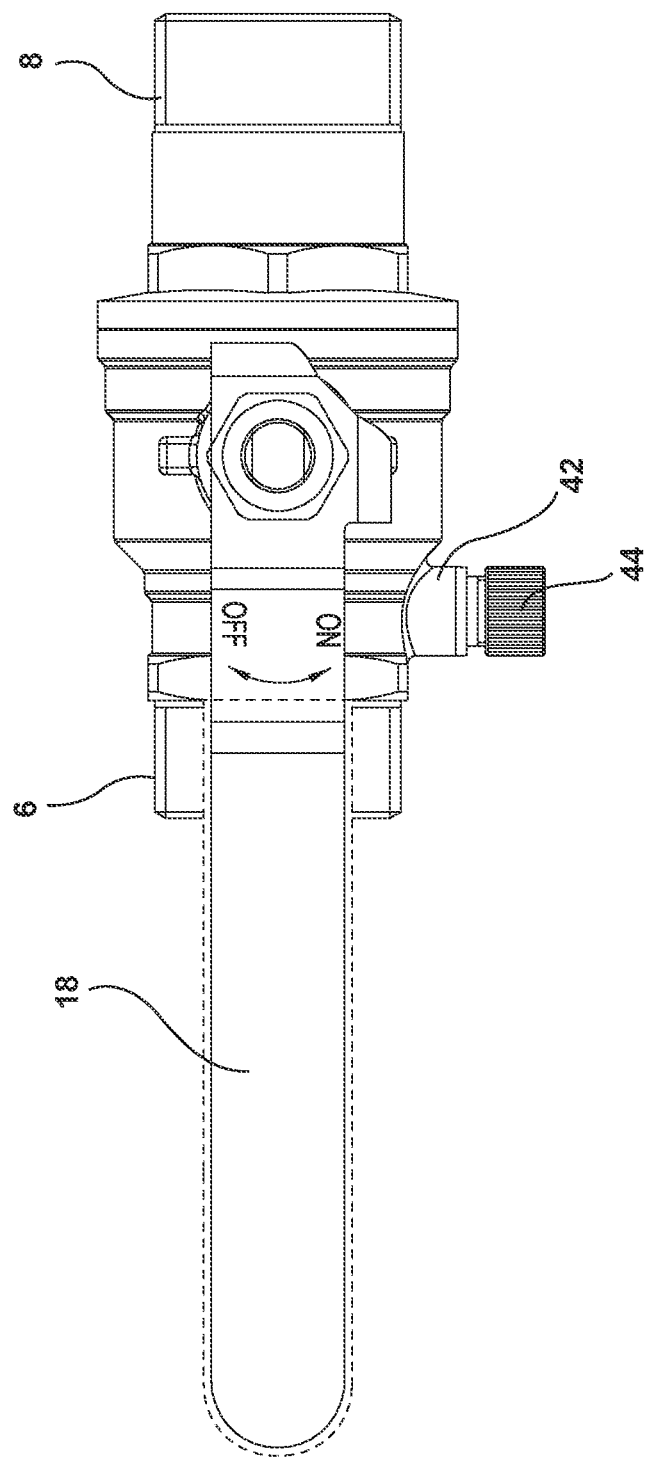
FIG. 2 is a top view of the ball check valve assembly shown in FIG. 1.
Figure 3:
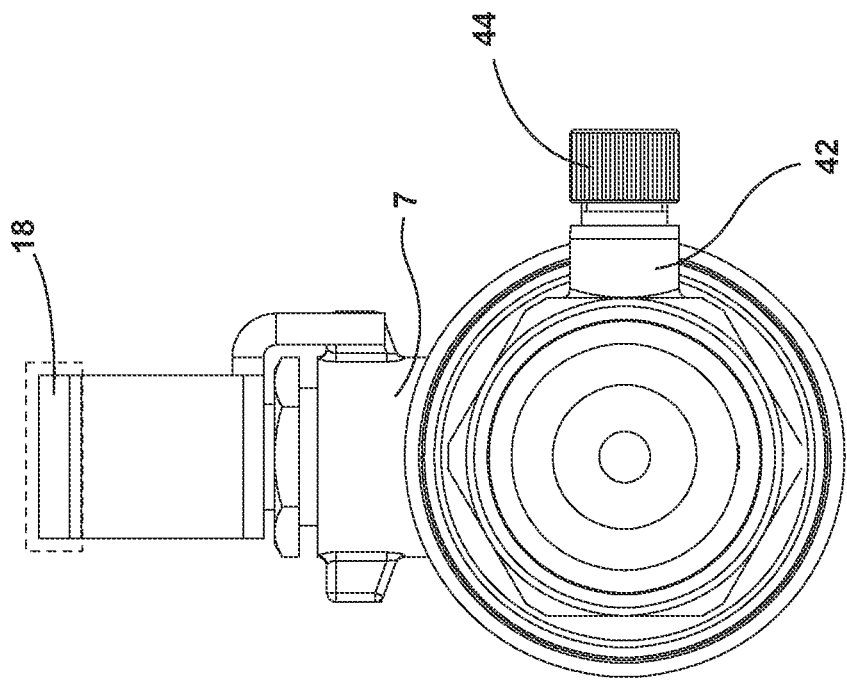
FIG. 3 is a left side view of the ball check valve assembly shown in FIG. 1.
Figure 4:
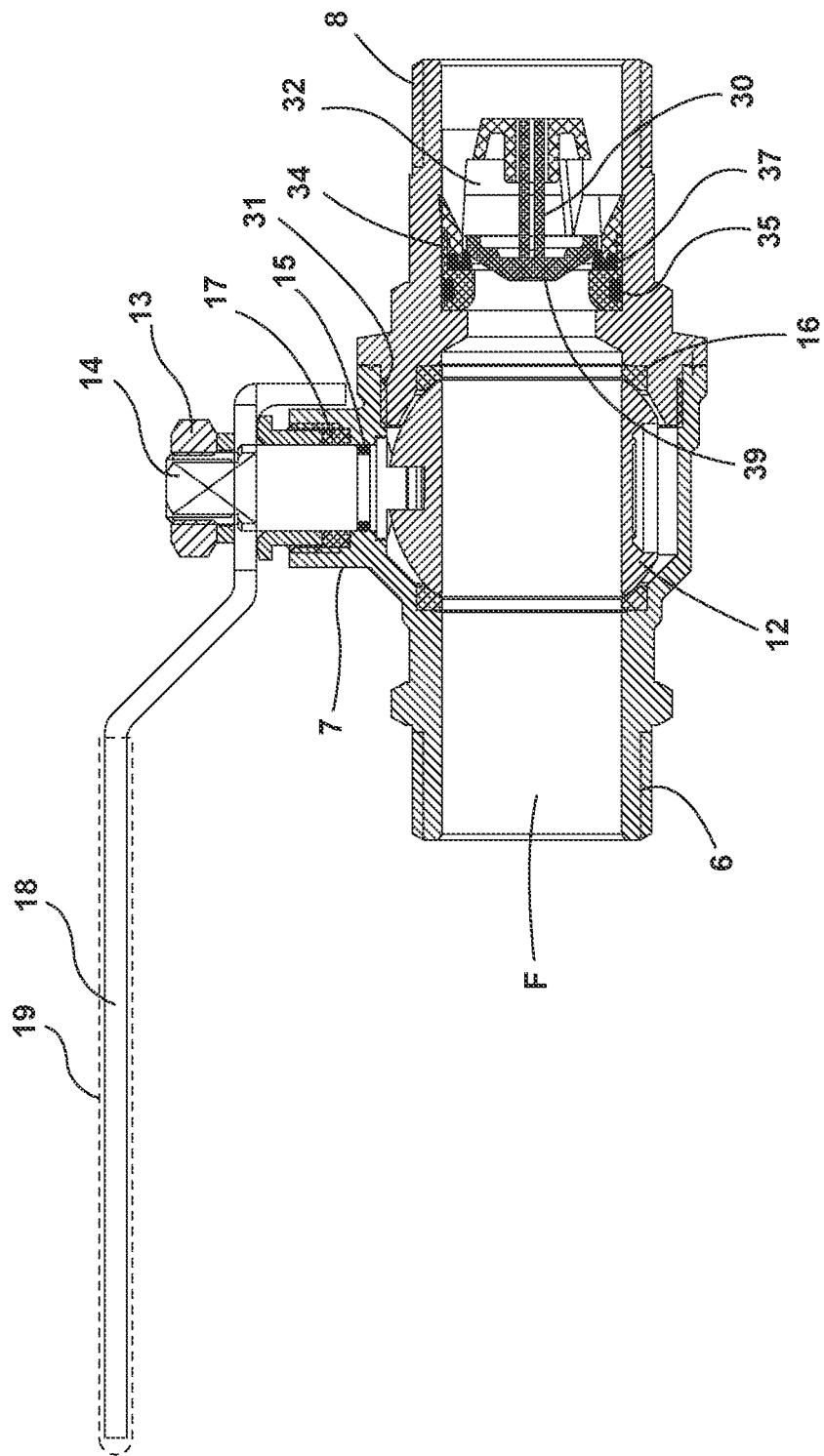
FIG. 4 is a cross-sectional view of the ball check valve assembly shown in FIG. 1.
Figure 5:
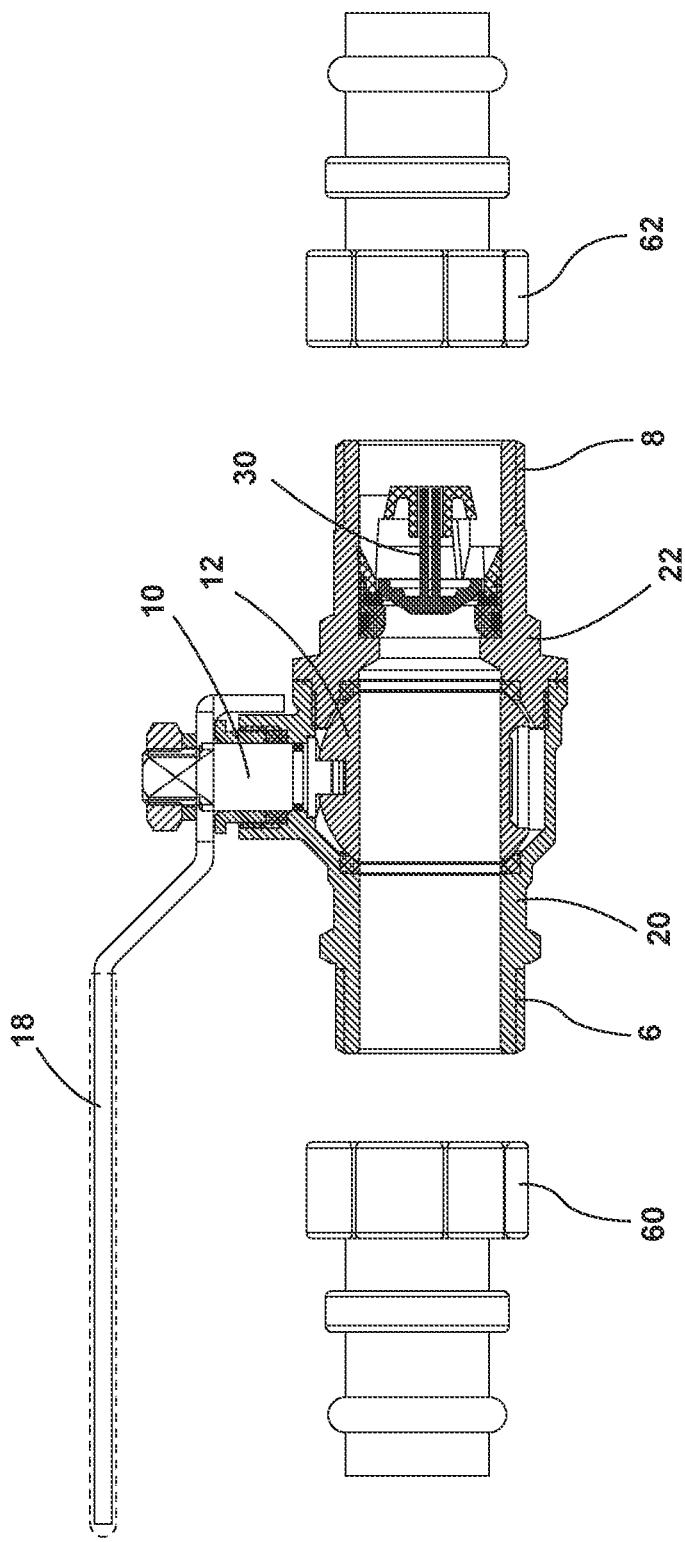
FIG. 5 is a cross-sectional view of the ball check valve assembly shown in FIG. 1, with the additional union fittings for the incoming and an outgoing ends of the ball check valve assembly.
Figure 6:
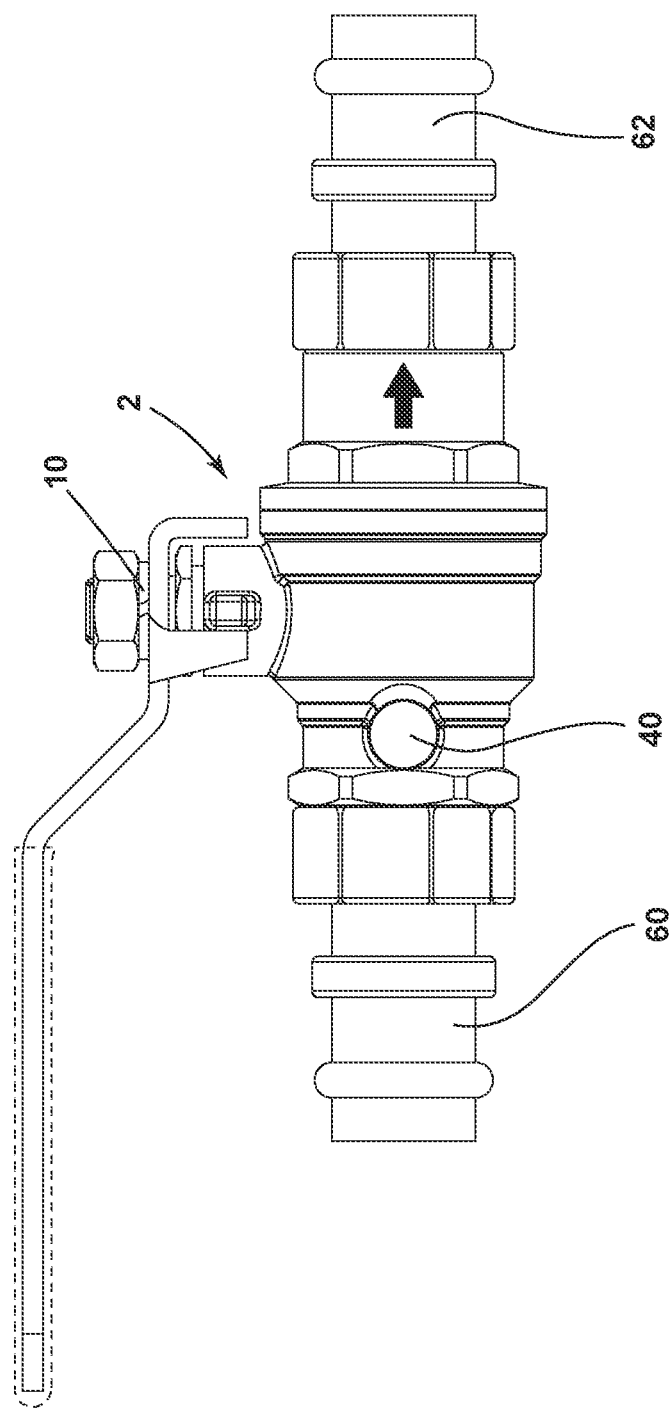
FIG. 6 is a front view of the ball check valve assembly shown in FIG. 1 coupled to the union fitting.

A ball check valve assembly 2 is illustrated in FIGS. 1-7. The ball check valve assembly 2 includes a body 4. The body 4 includes an incoming fitting end 6 and an outgoing fitting end 8. In addition, the body 4 includes a stem opening 7 and a bleeder drain valve port 42. The body 4 can be made as a unitary piece, or can be made with a first section 20 and second section 22, as illustrated in the drawings. First section 20 and second section 22 can be coupled together, as illustrated in FIGS. 4 and 5. The first section 20 includes the incoming fitting end 6, the stem opening 7, and the bleeder drain valve port 42, while the second section 22 includes the outgoing fitting end 8. The coupling between the first section 20 and second section 22 can include a threaded coupling with, for example, a male pipe thread on the exterior surface of the second section 22 and a female pipe thread on the interior surface of the first section 20. One or more sealing members 31 can also be included in the coupling.

The ball check valve assembly 2 includes a first valve member 10. The first valve member 10 includes a ball 12 that is positioned in the fluid passageway F that extends between the incoming fitting end 6 and the outgoing fitting end 8. The ball 12 is sealed by seals 16 in the fluid passageway. The ball 12 couples to a stem 14 that is coupled to a handle 18. The handle 18 may include a handle sleeve 19. The stem 14 is received within stem opening 7 in the body 4. The stem 14 is sealed with respect to the stem opening 7 by the stem seal 15 and stem packing 17. The handle 18 may be secured onto the stem 14 by use of a nut 13.

A spring check valve 30 is an insert installed in the interior of the outgoing fitting end 8, as illustrated in FIGS. 4 and 5. The spring check valve 30 includes a spring member 32 that presses the stopper 39 to seal the spring check valve 30 with respect to the fluid passageway F. The stopper 39 compresses against seal 37. Seal 37 is a dual lobe seal that contacts a first sealing retainer section 34a of the housing 34 and a second sealing retainer section 34b of the spring check valve 30 when the spring check valve 30 is in a closed position. The first sealing retainer section 34a and the second sealing retainer section 34b are illustrated a separate pieces and may be made of different materials. As illustrated in FIG. 4, the first sealing retainer section 34a includes a portion that is received in between the lobes of seal 37. Seal 37 thus seals against the stopper 39, the first sealing retainer section 34a, and the second sealing retainer section 34b when the spring check 30 is in a closed position. The spring check valve 30 can include a seal 35 that contacts the interior of the outgoing fitting end 8. When the pressure of the fluid flow from the incoming fitting end 6 is sufficient to overcome the pressure of the spring 32, the stopper 39 will compress the spring member 32 and open the fluid passageway F to the outgoing fitting end 8.

The bleeder drain valve 40 includes a bleeder drain valve port 42 formed on the first section 20 of the body 4, as described above. A cap 44 is placed on the bleeder drain valve 40. The bleeder drain valve 40 allows for pressure release and draining of the ball check valve assembly 2.

Figure 7:
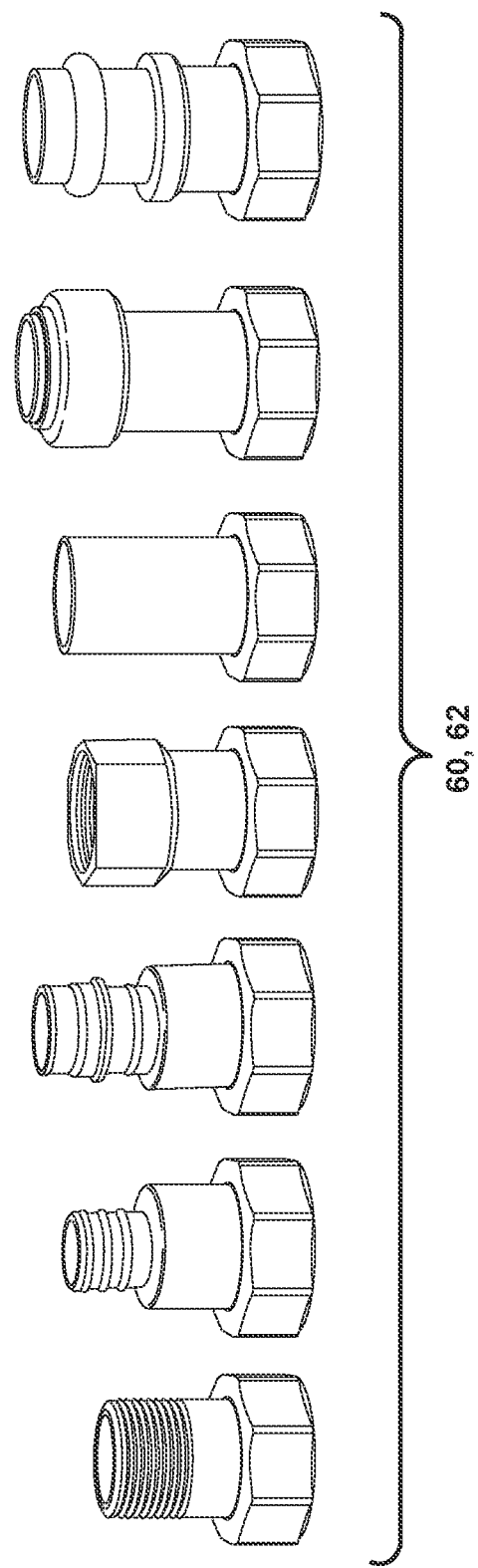
FIG. 7 is a front perspective view of exemplary union fittings that can be used with the ball check valve assembly shown in FIG. 1.

An incoming union fitting 60 and an outgoing union fitting 62 are coupled to the incoming fitting end 6 and outgoing fitting end 8, respectively. The union fittings 60, 62 can provide any type of coupling to pipe, including PEX, male pipe thread, female pipe thread, sweat, push-to-connect, press, etc. Some of these various options for union fittings 60, 62 are illustrated in FIG. 7. The union fittings 60, 62 are coupled to the exterior surfaces of the incoming fitting end 6 and outgoing fitting end 8. The incoming fitting end 6 and outgoing fitting end 8 can have a male pipe thread surface to permit the coupling of the union fittings 60, 62 (having female pipe threads), as illustrated in FIG. 5. The union fittings 60, 62 can use O-ring seals (not shown).

The use of dual union fittings 60, 62 permits the easy removal of the ball check valve assembly 2 from the incoming supply pipe that is connected to the union fitting 60 and the outgoing pipe that is coupled to union fitting 62.

The bleeder drain valve 40 allows for pressure release and draining of the ball valve check assembly 2. Thus, when the check valve 30 needs to be serviced and/or replaced, first valve member 10 may be rotated to close the fluid passageway between the incoming fitting end 6 and outgoing fitting end 8. The bleeder drain valve 40 may then be opened to relieve the pressure in the ball check valve assembly 2 before the union fittings 60, 62 are disengaged from the incoming fitting end 6 and outgoing fitting end 8, thereby permitting removal of the ball check valve assembly 2.

The spring check valve 30 may then be cleaned and/or replaced. The spring check valve has a housing 34 that fits within the interior of the outgoing fitting end 8, as shown in FIGS. 4 and 5. The spring check valve 30 permits the flow of the fluid from the incoming fitting end 6 to the outgoing fitting end 8 provided there is pressure in the system and the first valve member 10 is positioned such that the ball 12 opens the fluid passageway F between the incoming fitting end 6 and outgoing fitting end 8. When the ball 12 is positioned to close the fluid passageway F between the incoming fitting end 6 and the outgoing fitting end 8, the spring member 32 of the spring check valve 30 should compress the stopper 39 of the spring check valve to close the spring check valve 30. The spring check valve 30 prevents the backflow of fluid from the outgoing fitting end 8 to the incoming fitting end 6, thereby preventing a water hammer, air bubble, or debris from entering the incoming fitting end 6.

The handle 18 that is coupled to the first valve member 10 can be reversed to permit the opening and closing of the ball 12 from different positions, allowing for installation and orientation flexibility.

The body 4 can be formed of a metal material and, as described above, can be formed of a first section 20 coupled to a second section 22, as shown in the drawings, or can be formed as a unitary body. The body 4 can be formed of brass alloy, such as a dezanification-resistant (DZR) brass alloy. When the body 4 includes a first section 20 and second section 22, the second section 22 may be removed from the first section 20 after the first valve member 10 has closed the fluid passageway F between the incoming fitting end 6 and the outgoing fitting end 8. This permits the removal of the second section 22 from the first section 20 when union fitting 62 is removed from the outgoing fitting end 8. In this arrangement the spring check valve 30 may be serviced and/or replaced without removing the first section 20, containing the first valve member 10, from the plumbing system.

In the foregoing description, it will be readily appreciated by those skilled in the art that modifications may be made to the invention without departing from the concepts disclosed herein. Such modifications are to be considered as included in the following claims, unless these claims by their language expressly state otherwise.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. A valve assembly, comprising:
   a body having a fluid passageway extending between an incoming fitting end and an outgoing fitting end;
   a rotary first valve member in the fluid passageway; and
   a spring biased reciprocating check valve insert positioned in the fluid passageway between said first valve member and said outgoing fitting end, said spring check valve insert including a dual lobed seal that concurrently contacts a first sealing retainer section of the spring check valve insert, a second sealing retainer, and a stopper when the spring biased reciprocating check valve is in a closed position.

2. The valve assembly of claim 1, wherein said incoming fitting end is a first union fitting end.

3. The valve assembly of claim 2, wherein said outgoing fitting end is a second union fitting end.

4. The valve assembly of claim 1, further including a bleeder drain valve positioner on said valve body.

5. The valve assembly of claim 3, wherein the exterior surface of said body includes a male pipe thread on said first and second union fitting ends.

6. The valve assembly of claim 1, including a reversible handle coupled to said rotary first valve member.

7. The valve assembly of claim 1, wherein said body is a unitary piece of metal.

8. A valve assembly, comprising:
   a body having a fluid passageway extending between an incoming fitting end and an outgoing fitting end;
   a rotary first valve member with a ball positioned in the fluid passageway; and
   a spring biased reciprocating check valve insert positioned in the fluid passageway in between said first valve member and said outgoing fitting end, said spring check valve insert including a dual lobed seal that simultaneously contacts a first sealing retainer section of the spring check valve insert, a second sealing retainer section, and a stopper when the spring biased reciprocating check valve is in a closed position.

9. The valve assembly of claim 8, wherein said incoming fitting end is a first union fitting end.

10. The valve assembly of claim 9, wherein said outgoing fitting end is a second union fitting end.

11. The valve assembly of claim 8, further including a bleeder drain valve positioned on said valve body.

12. The valve assembly of claim 10, wherein the exterior surface of said body includes a male pipe thread on said first and second union fitting ends.

13. The valve assembly of claim 8, including a reversible handle coupled to said rotary first valve member.

14. The valve assembly of claim 8, wherein said body includes a first section with the incoming fitting end and an opening for the stem of the first valve member and a second section within the outgoing fitting end.

15. A piping assembly, comprising:
   a valve body having a fluid passageway extending between an incoming fitting end and an outgoing fitting end;
   a first rotary valve member in the fluid passageway; and
   a spring biased reciprocating check valve insert having a spring member positioned in the fluid passageway in between said first valve member and said outgoing fitting end, said spring check valve insert including a dual lobed seal that concurrently contacts a first sealing retainer section of the spring check valve, a second sealing retainer section, and a stopper when the spring biased reciprocating check valve insert is in a closed position.

16. The piping assembly of claim 15, wherein said spring member is a coiled spring.

17. The piping assembly of claim 15, further including a bleeder drain valve positioned on said valve body.

18. The piping assembly of claim 15, further including an incoming water supply pipe coupled to said incoming fitting end and an outgoing water supply pipe coupled to said outgoing fitting end.

19. The piping assembly of claim 15, including a reversible handle coupled to said first rotary valve member.

20. The piping assembly of claim 15, wherein said body is a unitary piece of metal.

* * * * *